Jan. 24, 1967 A. J. LOMBARDI 3,300,749

DEVICES FOR ENGAGING FOR RELATIVE MOVEMENT THE TURNS OF A HELICAL ELEMENT

Filed Sept. 27, 1965 4 Sheets-Sheet 1

INVENTOR.
ANTHONY J. LOMBARDI
BY
Percy P. Lantzy
ATTORNEY

INVENTOR.
ANTHONY J. LOMBARDI
BY Percy P. Lantzy
ATTORNEY

Jan. 24, 1967 A. J. LOMBARDI 3,300,749

DEVICES FOR ENGAGING FOR RELATIVE MOVEMENT
THE TURNS OF A HELICAL ELEMENT

Filed Sept. 27, 1965 4 Sheets-Sheet 3

INVENTOR.
ANTHONY J. LOMBARDI
BY Percy P. Lantzy
ATTORNEY

INVENTOR.
ANTHONY J. LOMBARDI
BY Percy P. Lantzy
ATTORNEY

United States Patent Office 3,300,749

Patented Jan. 24, 1967

3,300,749

DEVICES FOR ENGAGING FOR RELATIVE MOVEMENT THE TURNS OF A HELICAL ELEMENT

Anthony J. Lombardi, Wyckoff, N.J., assignor to International Telephone and Telegraph Corporation, Nutley, N.J., a corporation of Maryland Filed Sept. 27, 1965, Ser. No. 490,480
9 Claims. (Cl. 339—9)

This invention relates to helical wire or thread engaging devices and more particularly to devices for movably engaging, electrically and/or mechanically, the turns of a helical coil or antenna or the threads of a helically threaded shaft.

Heretofore, helical conductors and contacting devices therefor have been known in which the turns of the helix have served as threads to guide the contacting devices therealong lengthwise of the helix. Such known devices seek to insure good electrical contact, and to provide for deviations in the helical form of the helical conductor, by using a conductor with resilient contactors constrained thereagainst. However, such devices offer but a limited contacting area and, with the fatigue to the contactor metal, or marked deviation in the arcuate curvature of the turn, or both, the contact area is effectively lessened. This invites arcing and undue heating which can pit or abrade the conductor and erode the contactors; especially is this so when high current is involved. Further, these known devices require complex cranks and linkages to cause them to traverse contiguous arcuate portions of the helix, while rotating within or upon the outer surface thereof, and while seeking to retain good electrical contact therewith.

Other contacting devices known in the art rotate a contact member within or about the helical antenna or coil for contact with a surface of the helix. Yet, here too, fatigue of the contactors or their biasing means, and/or deviations in the forms of the helix allow gaps to occur, inviting the damage occasioned by arcing, and fail to maintain a constant engagement of the turns during movement of the contacting device therealong. More, the contratcors can be deflected, causing pitting or scoring on the helix surface, and even slip off the helical surface.

Considerable effect has been made heretofore to construct an effective anti-backlash thread engaging device for threaded shafts. The movable contact device of the present invention provides not only an effective movable electrical contact for the turns of a helical coil or antenna but also overcomes any backlash tendency in such contact arrangements and in fact is applicable as an anti-backlash device for threaded shafts, either internally or externally threaded.

An object of this invention is to provide a relatively movable or slidable contact device for helical conductors or threads which maintains positive resilient engagement with the helical conductor or thread, in directions both forwardly and rearwardly of the axis of the helix.

Another object is the provision of an electrical contacting device for a helical conductor insuring a constant circular contact throughout substantially a full turn of the helical conductor.

Another object is the provision of a contacting device within or about the helix of an antenna, coil or other helically threaded member whereby rotational movement between the device and the turns of the helix causes the device to traverse lengthwise of the turns while maintaining a positive resilient contact therewith.

Another object is the provision of a contacting device for a helical element which is of simple manufacture and assembly, having resiliently self-adjusting contactors which are arrayed so as to effect electrical and/or mechanical contact at plural points along the helical element against adjacent or opposed surfaces thereof for substantially a full turn.

Still another object of this invention is to provide an anti-backlash relationship between the turns or threads of a helix and the contact device engaging the turns or threads.

A feature of this invention is the provision of a plurality of contactors disposed along substantially a full turn of a helical element, in a manner providing a screw thread engagement therewith, with means for causing relative movement of the contactors with respect to the helical element while maintaining the contactors in positive resilient engagement with the helical element.

The above and other objects and features of this invention will become more apparent by reference to the following description taken in conjunction with the accompanying drawings, in which.

Figures 1, 2, 3, 4, 5:
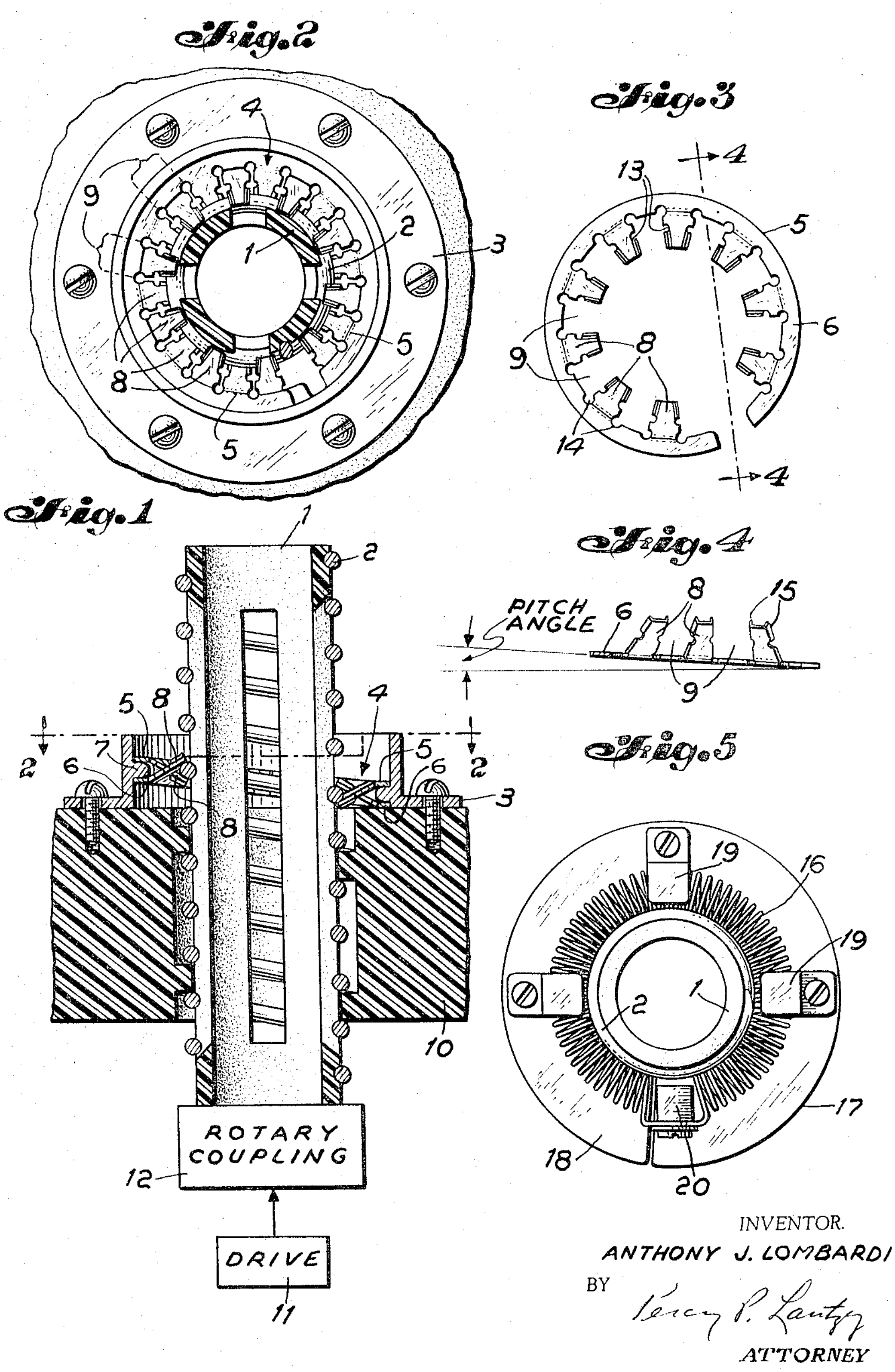
FIG. 1 is a view in vertical section of an antenna provided one embodiment of the invention.
FIG. 2 is a cross-sectional view taken along line 2—2 of FIG. 1 showing in plan view the contact device of this invention.
FIG. 3 is a plan view of a single contactor ring of the embodiment shown in FIGS. 1 and 2.
FIG. 4 is a sectional view of the contactor ring taken along line 4—4 of FIG. 3.
FIG. 5 is a plan view of another embodiment of the invention.

With reference to FIGS. 1–4, a helical coil 1 is shown of the type sometimes used as an antenna. The antenna has helical turns 2 shown with a housing 3 thereabout. A shorting member 4 is positioned between the antenna and housing. The shorting memebr 4 includes flat rings 5 and 6. The rings 5 and 6 are secured to opposite sides of a helically-formed shoulder 7 which extends inwardly from the housing 3. Each of the rings 5 and 6 has equally spaced contacting elements or fingers 8 which are resiliently constrained against and in contact with substantially a complete turn of the antenna 1. The fingers 8 are interlaced through the interstices 9 of its complementary ring. Thus, the fingers of the two rings cooperate to resiliently engage opposite surfaces of substantially a full turn of the antenna 1. Structural member 10 repersents a portion of a beam or platform of associated equipment to which the housing 3 can be secured, and may be helically bored or rifled to allow the antenna turns to thread through. Drive means 11 and rotary coupling 12 provide rotary drive to rotate antenna 1 in housing 3 and member 10.

FIGURE 3 shows the configuration of one of the helical rings 6 of FIGURES 1 and 2, with fingers 8 equally spaced with intervening interstices 9. The fingers 8 have a first pair of opposite and arcuate strain relief cut-outs 13 along the outer edges thereof. A second pair of strain relief cut-outs 14 are disposed opposite the base of each finger 8 along the inner edge of the flat ring. In the sectional view of FIGURE 4 each finger 8 has formed in the extreme outer edges thereof upturned wings 15 These wings 15 insure an overriding traverse of the fingers 8 across any burrs or scoring occurring in the antenna turns 2. The fingers 8 shown in FIGURE 4 to be flexed upward from the plane of the ring. The flexure represents the attitude of the fingers 8 upon mating with a helical turn 2 of the antenna 1. Thus the fingers 8 of each ring are forced into this flexure so as to constrain against opposite sides of the turn 2. Each ring is formed into a helix having a pitch angle corresponding to the pitch angle of the turns 2.

Figures 6, 9:
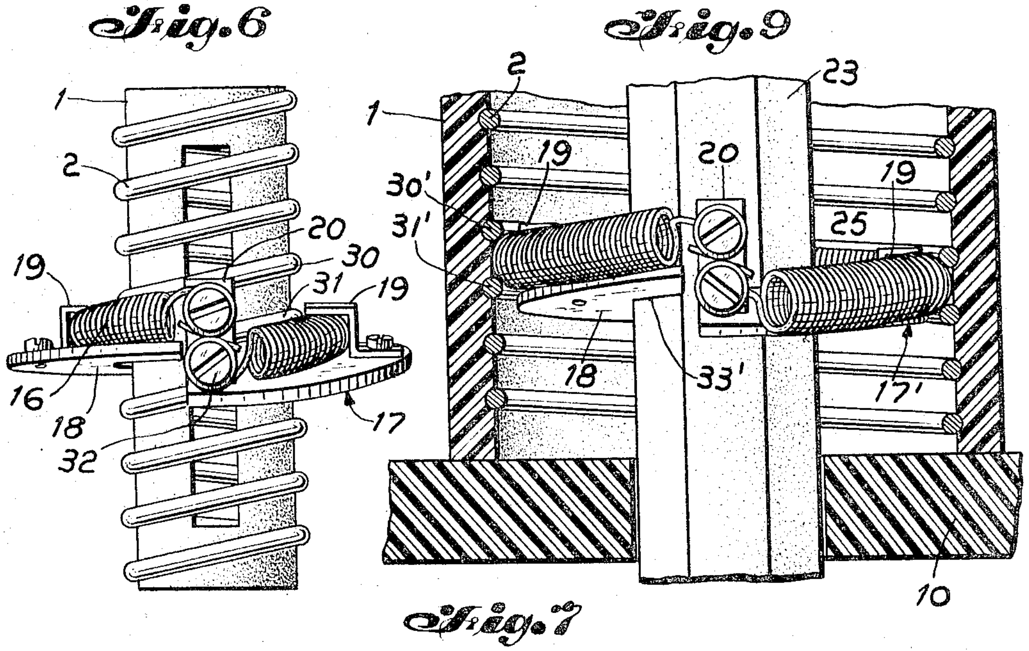
FIG. 6 is a side elevation view of the structure shown in FIGURE 5.
FIG. 9 is a cross-sectional view of an alternate embodiment of the structures shown in FIGURES 5 and 6.

FIGURES 5 and 6 depict another embodiment of this invention, where the shorting member is a garter-type closely wound, extension spring 16 helically wrapped about the helical coil or antenna 1, between and in contact with opposed surfaces of adjacent turns 30 and 31. The free length of spring 16 is less than that required for a full helical turn about the antenna; thus, spring 16 is extended and tightly urged against the conductor turns 30 and 31. The housing 17 has a helically formed base 18 and a plurality of retainers 19 by which the spring 16 is clamped to the base 18. The ends of the spring are secured by screws 32 to a bar 20 integral to the housing 17. Housing 17 may be secured to a structural member (a beam or platform of associated equipment) similarly as shown as member 10 in FIGURES 1 and 2.

Figure 7:
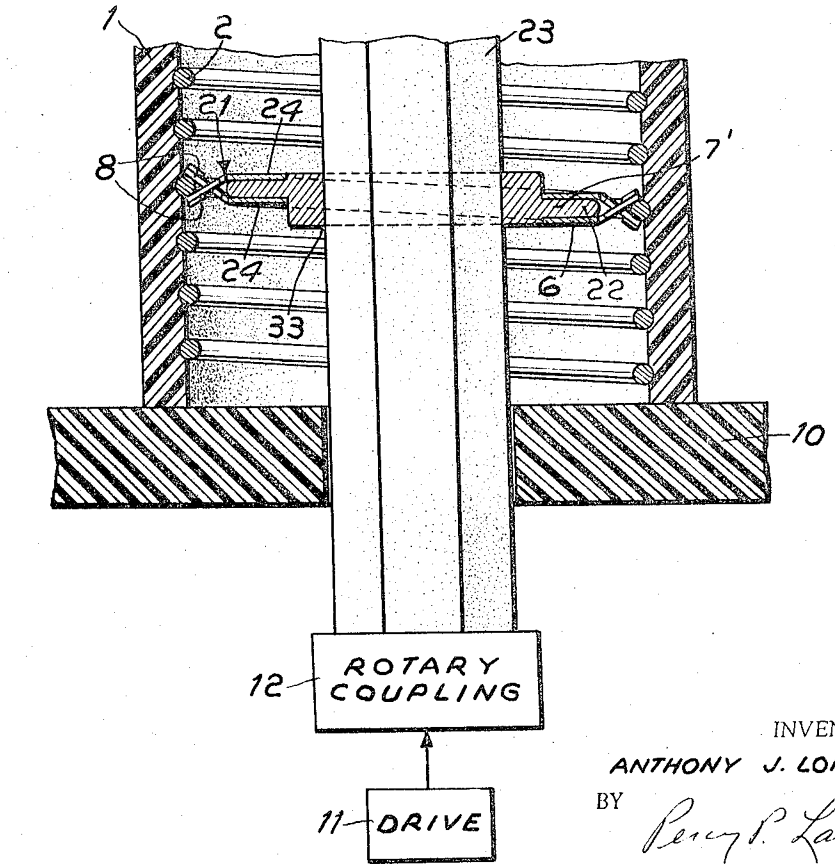
FIG. 7 is a cross-sectional view of an alternate embodiment of the structure shown in FIGURE 1.
Figure 8:
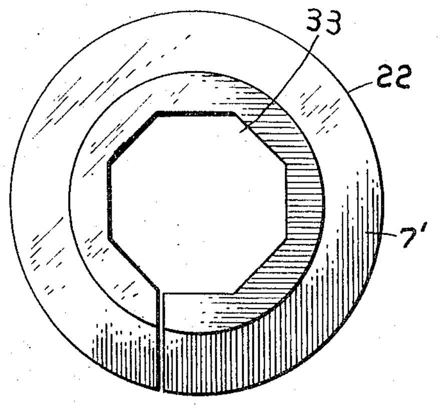
FIG. 8 is a plan view of the housing of the embodiment of FIGURE 7.

FIGURES 7 and 8 illustrate an alternate embodiment of the structure of FIGURE 1 where the shorting means 21 is positioned within the coil or antenna 1. In this embodiment, the housing 22 has a hexagonal or octagonal-shaped aperture 33 (FIGURE 8) through the center, which slidably receives a complementary-shaped drive rod 23, and a shoulder 7′ (similar to shoulder 7 of FIGURE 2) is formed about the periphery. The drive 11 and rotary coupling 12 are joined to the drive rod 23 and cause the shorting means 21 to traverse the antenna 1. Housing 22 is helically-formed and mounts a pair of rings 24 on the opposite surfaces thereof on shoulder 7′. Rings 24 are similar to rings 5 and 6 of FIGURES 1, 2, 3, and 4 except that the fingers 8 extend outwardly.

FIGURE 9 presents an alternate embodiment of the structure of FIGURES 4 and 5 deployed within helical turns of a coil or antenna. The embodiment shown in FIGURE 9 uses a compression spring 25 instead of the extension spring 16 of the embodiment in FIGURES 5 and 6. Spring 25 has a length slightly exceeding that length which would allow it to be relaxedly and helically disposed between adjacent turns 30′ and 31′. Thus, it is constantly being urged outward, insuring a constant contact with the adjacent turns 30′ and 31′ of the helical conductor. Housing 17′ has a hexagonal or octagonal-shaped aperture 33′ through the center, as has housing 22 of FIGURE 7 (shown in FIGURE 8), to slidably receive drive rod 23.

Figure 10:
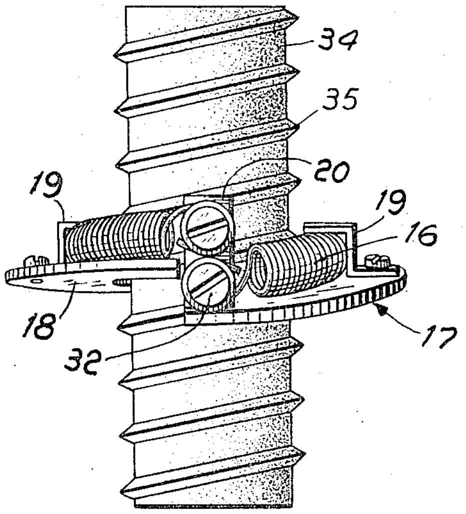
FIG. 10 is a side view of an alternative embodiment of the invention applying the anti-backlash feature of the invention to a threaded member.
Figure 11:
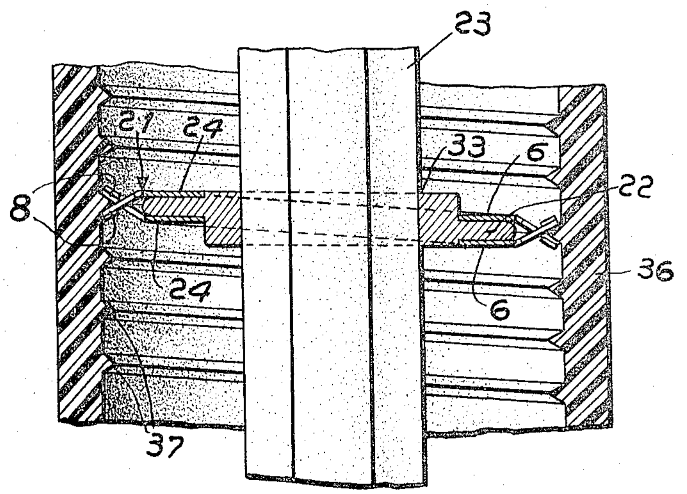
FIG. 11 is a cross-sectional view of an alternate embodiment of the structure shown in FIGURE 10.

In further embodiments of this invention the structures shown as shorting means, in FIGURES 1 through 9, can be used with internally or externally-threaded shafts to provide improved anti-backlash nut arrangements. In these, shafts are substituted for the coil, and helical threads, instead of conductor turns, would receive the fingers or springs. FIGURES 10 and 11 represent embodiments which an anti-backlash nut may take. In FIGURE 10 externally-threaded shaft 34 has helical threads 35 thereabout. The spring 16, housing 17, base 18, retainers 19, bar 20, and screws 32 are the same as the same-numbered elements shown in FIGURE 6. Finally, this embodiment may be assumed to have a drive means and coupling, and mounting means, as has the structure of FIGURE 2.

It is to be understood that the antenna shorting device shown in FIGURE 9 can also be used with an internally-threaded shaft, where antenna 1 and turns 2 would be supplanted by such an internally-threaded shaft, and spring 25 would be disposed between adjacent threads rather than turns 30′ and 31′, to provide an internal anti-backlash nut arrangement.

In FIGURE 11, a shorting means 21, such as that shown in FIGURE 7, is disposed within an internally-threaded shaft 36. Threads 37 receive the fingers 8 of rings 24, as in FIGURE 7, and the rings are secured to housing 22. Housing 22 has a hexagonal or octagonal-shaped aperture 33 to receive drive rod 23. Here also it is to be understood that the antenna shorting device shown in FIGURES 1 through 4 can also be used with an externally-threaded shaft. In this arrangement antenna 1 and turns 2 would be supplanted by such an externally-threaded shaft, and fingers 8 would engage the helical threads (such as threads 35 in FIGURE 10) of the shaft to provide an external anti-backlash nut.

Figure 12:
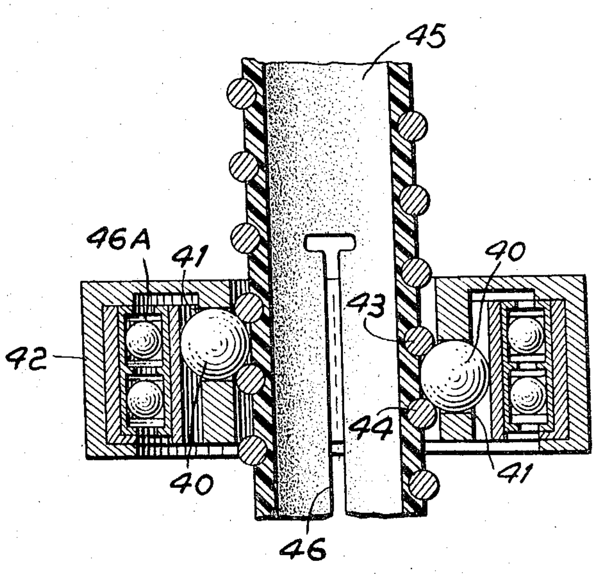
FIG. 12 is a cross-sectional view of a further embodiment employing contactors in the form of balls.

In each of the embodiments of FIGS. 1–11 the contactors of the contact device engage the helical conductor or thread at a plurality of points spaced therealong for substantially a full turn of the helix and with positive resilient force in directions both forwardly and rearwardly of the axis of the helix. In the embodiments shown in FIGS. 12, 13 and 14 the same positive resilient forces in opposite directions are also obtained by replacing the contactors with a plurality of contact balls, and by placing the supporting wall for the helix under tension. In FIG. 12 for example, the contact balls 40 are located in openings 41 contained in the housing 42. The balls 40 are disposed along a helical angle which corresponds to the pitch of the helical turns 43, 44 of the wire contained on the tubular member 45. The balls 40 engage the opposed surfaces of the adjacent turns 43, 44 and are held thereagainst with positive resilient force by the member 45 which is prestressed tending to expand outwardly relative the slot 46. The member 45 is provided with two or more such slots. A ball bearing 46A is contained in the housing 42 against which the balls 40 roll, the bearing 46A rolling in the opposite direction to movement to balls 40, thus providing for very low friction. This arrangement provides for high accuracy and low wear.

Figures 13, 14:
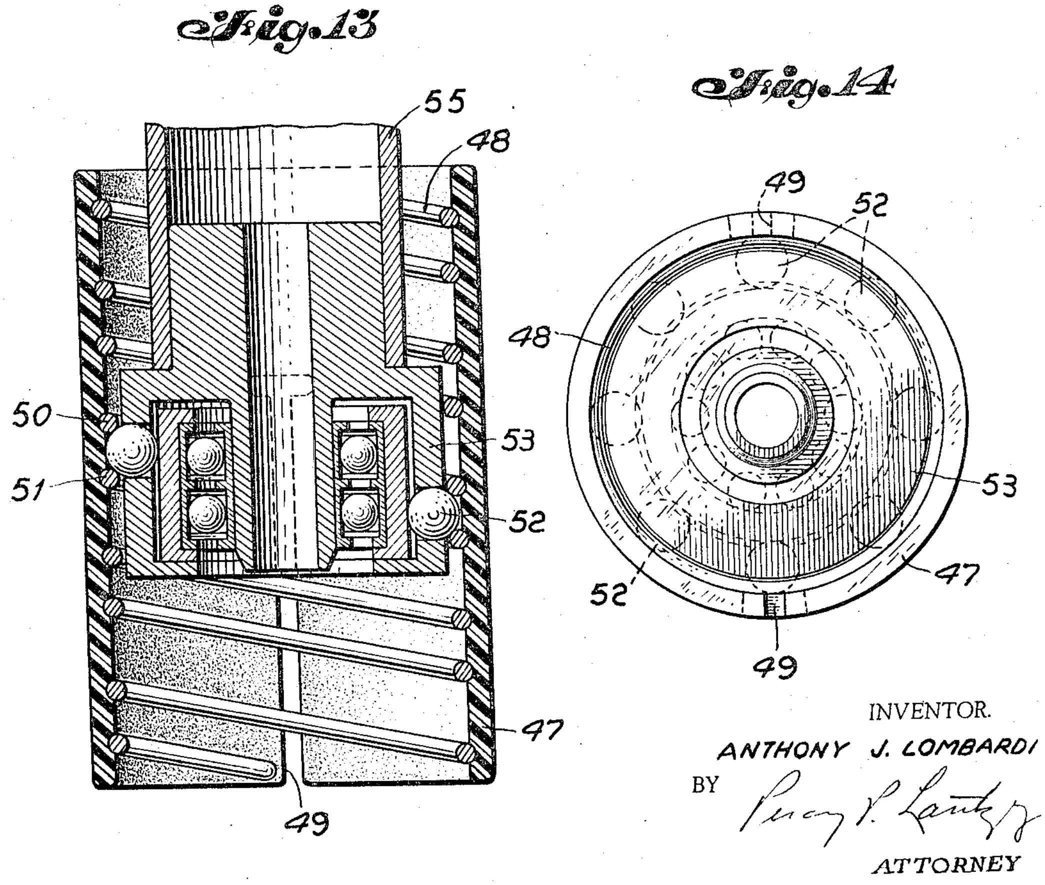
FIG. 13 is a cross-sectional view of an alternate embodiment to that shown in FIG. 12.
FIG. 14 is an end view of FIG. 13.

In FIGS. 13 and 14 the ball contact device is shown within the helix. In this form the tubular member 47 which supports the helical wire 48 has two or more slots 49 disposed axially thereof whereby prestressing of the member 47 exerts resilient inward pressure on the turns 50 and 51 such as shown in FIG. 13. While the helical element in FIG. 13 is shown as a pair of wires, the pair may be tied together electrically as parallel conductors or as in FIG. 12, the helical element may be a single conductor. The contact balls 52 are retained in a housing 53 similar to that shown in FIG. 12 except in reverse arrangement. The balls 52 are backed up by roller bearing 54 and the housing 47 is mounted on hollow shaft 55. By turning shaft 55 the contact balls 52 follow the turns of the helix bearing against the opposed surfaces of adjacent turns such as shown at 50, 51.

I claim:

1. A device for engaging for relative movement therewith the turns of a helical element comprising in combination, a helical electrical conductor, contact means having a plurality of contact elements, a support for said contact means disposing said contact elements in a series angular arrangement corresponding to the pitch of said helical electrical conductor so that said contact elements engage said helical electrical conductor at a plurality of points spaced along said helical electrical conductor, and means cooperating with said support to apply resilient force between said contact elements and said helical electrical conductor in directions both forwardly and rearwardly of the axis of said helix formed by said helical electrical conductor.

2. A device for engaging for relative movement therewith the turns of a helical element comprising in combination a screw thread, contact means having a plurality of contact elements, a support for said contact means disposing said contact elements in a series angular arrangement corresponding to the pitch of said screw thread so that said contact elements engage said screw thread at a plurality of points spaced along said screw thread, and means cooperating with said support to apply resilient force between said contact elements and said screw thread in directions both forwardly and rearwardly of the axis of said helix formed by said screw thread.

3. A device for engaging for relative movement therewith the turns of a helical element comprising in combination, a helical element, contact means having a plurality of contact elements, a support for said contact means disposing said contact elements in a series angular arrangement corresponding to the pitch of said helical element so that said contact elements engage said helical element at a plurality of points spaced along said helical element, and means cooperating with said support to apply resilient force between said contact elements and said helical element in directions both forwardly and rearwardly of the axis of the helix formed by said helical element, said contact means including two ring members each having spaced contact elements, and said ring members being carried by said support with the contact elements of said rings interleaved to engage opposite sides of said helical element.

4. A device according to claim 3 wherein said support is provided with a flange curved according to the pitch angle of said helical element and means securing one of said ring members to each side of said flange.

5. A device according to claim 3 wherein each ring member has a flat ring portion and each contact element is disposed at angle to said flat ring portion.

6. A device for engaging for relative movement therewith the turns of a helical element comprising in combination, a helical element, contact means having a plurality of contact elements, a support for said contact means disposing said contact elements in a series angular arrangement corresponding to the pitch of said helical element so that said contact elements engage said helical element at a plurality of points spaced along said helical element, and means cooperating with said support to apply resilient force between said contact elements and said helical element in directions both forwardly and rearwardly of the axis of the helix formed by said helical element, said contact means including a coil spring and means to secure said spring on said support for resilient engagement with opposed surfaces of two adjacent turns of said helical element.

7. A device according to claim 6 wherein said support includes a ring shaped portion curved according to the pitch angle of said helical element and means to support said coil spring therealong with the ends secured to said support causing the turns of said coil spring to engage said helical element with resilient force.

8. A device for engaging for relative movement therewith the turns of a helical element comprising in combination, a helical element, contact means having a plurality of contact elements, a support for said contact means disposing said contact elements in a series angular arrangement corresponding to the pitch of said helical element so that said contact elements engage said helical element at a plurality of points spaced along said helical element, and means cooperating with said support to apply resilient force between said contact elements and said helical element in directions both forwardly and rearwardly of the axis of the helix formed by said helical element, said contact means including a housing having a series of openings disposed according to the pitch angle of said helical element and a contact ball in each of said openings adapted for rolling engagement with the opposed surfaces of two adjacent turns of said helical element.

9. A device according to claim 8 wherein said helical element is supported on a tubular member and said tubular member has at least one slot axially thereof whereby said tubular member urges said helical element into resilient engagement wtih the contact balls of said contact means.

References Cited by the Examiner

UNITED STATES PATENTS

| | | | |
|---|---|---|---|
| 2,472,230 | 6/1949 | Reinschmidt | 200—4 X |
| 2,874,237 | 2/1959 | Shlesinger | 200—4 |
| 3,047,683 | 7/1962 | Shlesinger | 200—26 |
| 3,138,672 | 6/1964 | Shlesinger | 200—11 |

ROBERT K. SCHAEFER, *Primary Examiner.*

J. R. SCOTT, *Assistant Examiner.*